(12) United States Patent
Ishii

(10) Patent No.: US 8,189,214 B2
(45) Date of Patent: May 29, 2012

(54) IMAGE FORMING APPARATUS FOR DOCUMENT IDENTITY ASCERTAINMENT

(75) Inventor: Hiroshi Ishii, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1183 days.

(21) Appl. No.: 11/711,408

(22) Filed: Feb. 27, 2007

(65) Prior Publication Data

US 2008/0037034 A1    Feb. 14, 2008

(30) Foreign Application Priority Data

Aug. 10, 2006   (JP) .................................. 2006-218209

(51) Int. Cl.
  *G06K 15/00* (2006.01)
(52) U.S. Cl. .................... 358/1.14; 358/1.15; 358/1.16; 713/176; 283/17
(58) Field of Classification Search .................. 713/150, 713/151, 168, 176; 382/100; 380/277; 283/17
  See application file for complete search history.

(56) References Cited

U.S. PATENT DOCUMENTS

| | | | | |
|---|---|---|---|---|
| 5,912,974 | A * | 6/1999 | Holloway et al. | 713/176 |
| 6,711,677 | B1 * | 3/2004 | Wiegley | 713/151 |
| 7,152,047 | B1 * | 12/2006 | Nagel | 713/176 |
| 2002/0012445 | A1 * | 1/2002 | Perry | 382/100 |
| 2004/0109567 | A1 * | 6/2004 | Yang et al. | 380/277 |
| 2004/0109568 | A1 * | 6/2004 | Slick et al. | 380/277 |
| 2004/0111603 | A1 * | 6/2004 | Iwamura | 713/150 |
| 2004/0169366 | A1 * | 9/2004 | Duffell et al. | 283/17 |
| 2005/0141012 | A1 * | 6/2005 | Oomura | 358/1.15 |
| 2005/0193200 | A1 * | 9/2005 | Akiba et al. | 713/168 |
| 2007/0150968 | A1 | 6/2007 | Chiba et al. | |

FOREIGN PATENT DOCUMENTS

| | | |
|---|---|---|
| JP | 11-003390 A | 1/1999 |
| JP | 2001-225523 A | 8/2001 |
| JP | 2002-158865 A | 5/2002 |
| JP | 2002-209039 A | 7/2002 |
| JP | 2005-271431 A | 10/2005 |
| WO | WO 2006/030514 A1 | 3/2006 |

OTHER PUBLICATIONS

Japanese Office Action dated Feb. 10, 2009 (4 pages), and English translation thereof (7 pages) issued in counterpart Japanese Application No. 2006-218209.
Japanese Office Action (and English translation thereof) dated Jul. 22, 2008, issued in a counterpart Japanese Application.

* cited by examiner

*Primary Examiner* — Twyler Haskins
*Assistant Examiner* — Nicholas Pachol
(74) *Attorney, Agent, or Firm* — Holtz, Holtz, Goodman & Chick, PC

(57) ABSTRACT

An image forming apparatus includes a unique information acquisition unit to acquire unique information unique to document data to be a print object from the document data; a storage unit to store the acquired unique information in association with the document data, and to store the unique information as reference unique information; an image forming unit to print an image based on the stored document data and the unique information associated with the document data on a same recording medium; a reading unit to read the printed unique information as unique information to be compared; and a control unit to compare the unique information to be compared with the stored reference unique information to stop printing of the document data when the control unit judges that the unique information to be compared and the stored reference unique information do not accord with each other.

4 Claims, 7 Drawing Sheets

IMAGE FORMING APPARATUS FOR DOCUMENT IDENTITY ASCERTAINMENT

CROSS-REFERENCE TO RELATED APPLICATION

The present U.S. patent application claims a priority under the Paris Convention of Japanese patent application No. 2006-218209 filed on Aug. 10, 2006, which shall be a basis of correction of an incorrect translation.

BACKGROUND

1. Field of the Invention

The present invention relates to an image forming apparatus.

2. Description of Related Art

There has been conventionally used an image forming apparatus capable of forming (or printing) an image on a recording medium such as a paper stock, based on document data read with an image reading apparatus such as a scanner or document data transmitted through a network. Moreover, in order to examine the printed state of a printed recording medium (or printed matter), there has been conventionally proposed a technique that judges the suitability of the printed state of the printed matter by comparing an image on the printed matter taken by an imaging apparatus with a previously prepared reference image and performs the coding processing of the fault information of the printed matter judged to be "wrong" to print the coded fault information at a fixed position of the printed matter (see, for example, JP2005-271431A).

Incidentally, the document data to be a print object is to be once stored in the image forming apparatus, and a part of the document data is sometimes damaged owing to a cause such as a trouble. In this case, because the aforesaid conventional technique compares the image on the printed matter that has been acquired by image pick-up with the reference image for the judgment, the conventional technique has a problem of being unable to surely judge the fault parts to be "wrong" depending on the locations or scales of the part where the data has been damaged. In particular, in booklet printing, because there is the possibility of the whole page being treated as faultily printed paper even if abnormality occurs in a part of the sheets of the printed matter composed of a plurality of pages, a technique for surely judging the abnormality of printed matter has been solicited. Moreover, because the conventional technique needs to prepare a reference image to each page in case that the print object includes a plurality of sheets of printed matter such as a booklet print, the conventional technique has another problem of the increase of the quantity of the data to be stored in advance as reference images to enlarge the cost of storage management.

SUMMARY

It is an object of the present invention to provide an image forming apparatus capable of improving the accuracy of the abnormality judgment of printed matter.

To overcome at least one of the abovementioned problems, an image forming apparatus according to one embodiment that reflects one of aspects of the present invention comprises: a unique information acquisition unit to acquire unique information unique to document data to be a print object from the document data; a storage unit to store the acquired unique information as reference unique information in association with the document data; an image forming unit to print an image based on the stored document data and the unique information associated with the document data on a same recording medium; a reading unit to read the printed unique information as unique information to be compared; and a control unit to compare the unique information to be compared which has been read by the reading unit with the reference unique information stored in the storage unit to stop printing of the document data when the control unit judges that the unique information to be compared and the stored reference unique information do not accord with each other.

Preferably, the unique information acquisition unit acquires new unique information generated based on the unique information and print condition information to instruct a print condition of the document data corresponding to the unique information; the storage unit stores the acquired new unique information as the reference unique information; and the image forming unit prints new unique information on the recording medium, the new unique information generated based on the unique information associated with the document data and the print condition information pertaining to the document data.

Preferably, the unique information is a hash value.

Preferably, the image forming unit prints the image based on the unique information in a margin area of the recording medium.

Preferably, the image forming unit encodes the unique information to print the coded unique information on the recording medium.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

In the following, the best mode for implementing the present invention will be described in detail with reference to the attached drawings. However, the scope of the invention is not to be limited to the shown examples.

Figure 1:
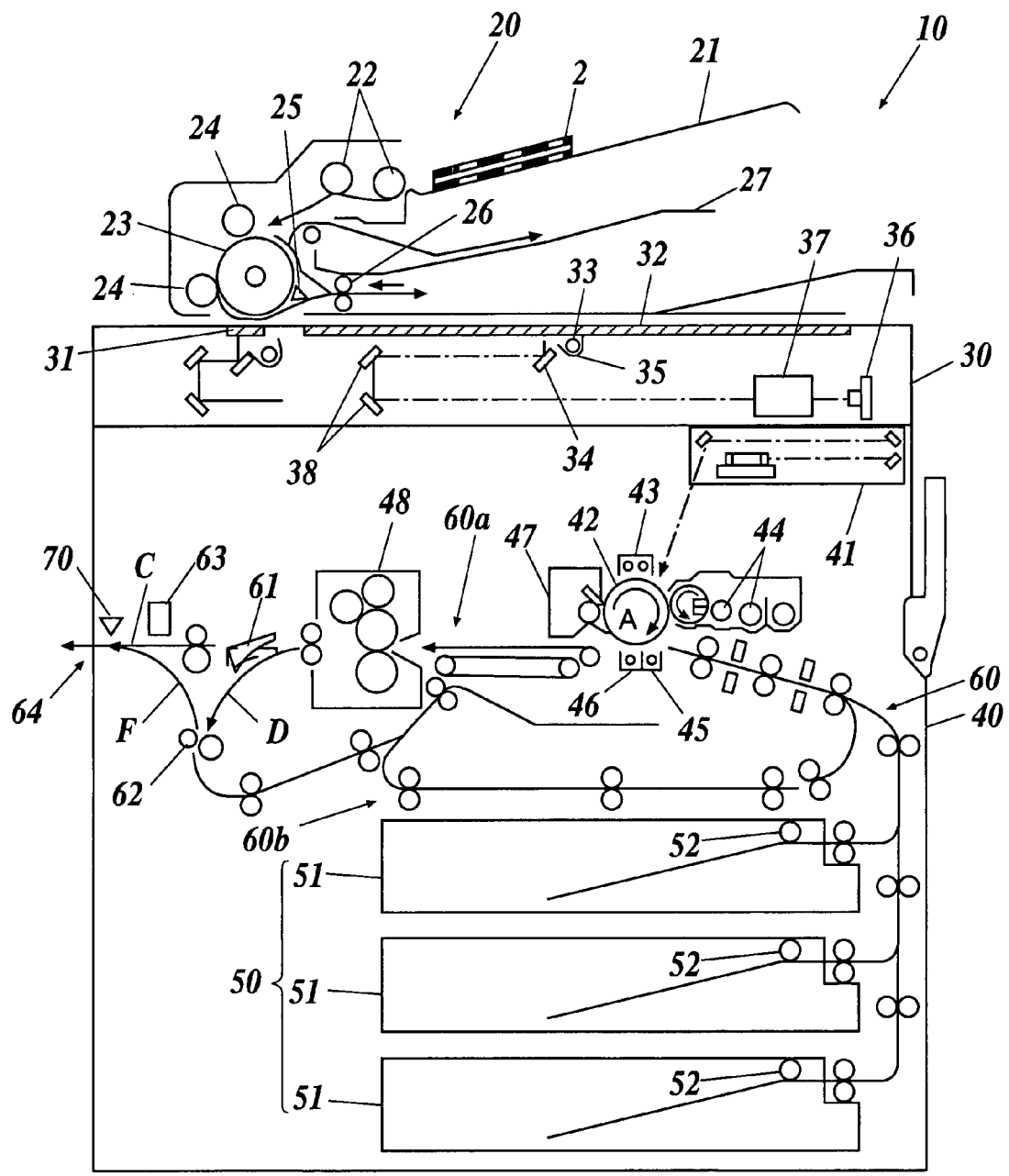
FIG. 1 is a view showing the internal configuration of an image forming apparatus.

First, the configuration of an image forming apparatus 10 of the present embodiment is described with reference to FIG. 1. The image forming apparatus 10 shown in FIG. 1 is a digital multiple function processing machine (or a multi function printer (MFP)) provided with the copy function of reading document data from an document to record (or print) the image of the read document data on a sheet-shaped recording medium such as a sheet of paper, the printer function of receiving a print job including the document data to be a print object from a personal computer or the like to record (or print) the image based on the document data on the recording medium in obedience to the print condition information included in the received print job, and the like.

Figure 2:
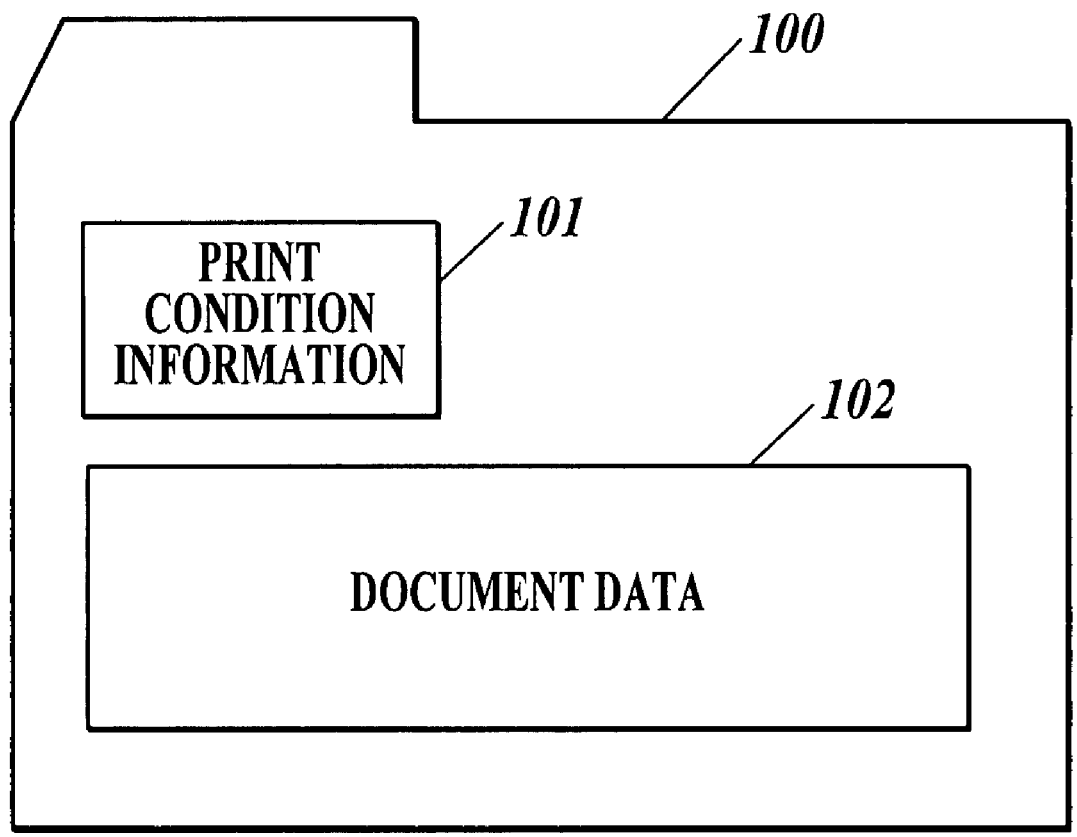
FIG. 2 is a schematic view showing an example of the data configuration of a print job.

FIG. 2 is a schematic view showing an example of the data configuration of a print job 100. The print job 100 is composed of print condition information 101 and document data 102 to be a print object, as shown in FIG. 2, and printing is arranged to be performed in the print job unit basis.

The print condition information 101 includes the print conditions at the time of printing the document data 102, such as "aggregation" for allocating a plurality of pieces of document data in one page, "rotation" for instructing a rotation of document data, "print copies" for instructing the number of print copies, "document page" for instructing the page number of document data, "margin area" for instructing to form a margin area at the time of printing, "paper size" for instructing the size of the recording medium on which printing is performed, "white paper insertion" for instructing the insertion of a white paper page, and the like.

The document data 102 means image data expressing a figure, a photograph or the like, text data composed of predetermined character codes, and the like, each of which is to be a print object. Each document data 102 has a header portion for storing the information pertaining to its own document data 102, and the header portion is arranged to store unique information (or a hash value) unique to the document data 102 acquired by a unique information acquisition unit 811 (see FIG. 3), which will be described later.

As shown in FIG. 1, the image forming apparatus 10 is provided with an automatic document feed apparatus 20, a scanner unit 30 and a printer unit 40.

The automatic document feed apparatus 20 is called as an auto document feeder (ADF), and is the apparatus that conveys an document 2 loaded on an document placing tray 21 to the read place of the scanner unit 30 sheet by sheet. Moreover, in the case of the document 2 that is a both sided document, the automatic document feed apparatus 20 reads one side of the document 2, and then inverts the obverse and the reverse of the document 2 to convey the document 2 to the scanner unit 30 again. The automatic document feed apparatus 20 is provided with first feed rollers 22 conveying the document 2 from the uppermost part one of the documents loaded on the document placing tray 21 in order, a contact roller 23 for making the document 2 pass with the document 2 being contacted to a contact glass 31, at which the document 2 is read, a guide roller 24 guiding the document 2 conveyed by the first feed rollers 22 along the contact roller 23, a switch claw 25 switching the conveyance direction of the document 2 that have passed the contact glass 31, inversion rollers 26 for inverting the obverse and the reverse of the document 2, a delivery tray 27, on which the document 2 the read of which has been completed is ejected, and a tray sensor (not shown) for detecting the existence of the document 2 on the document placing tray 21.

Figure 3:
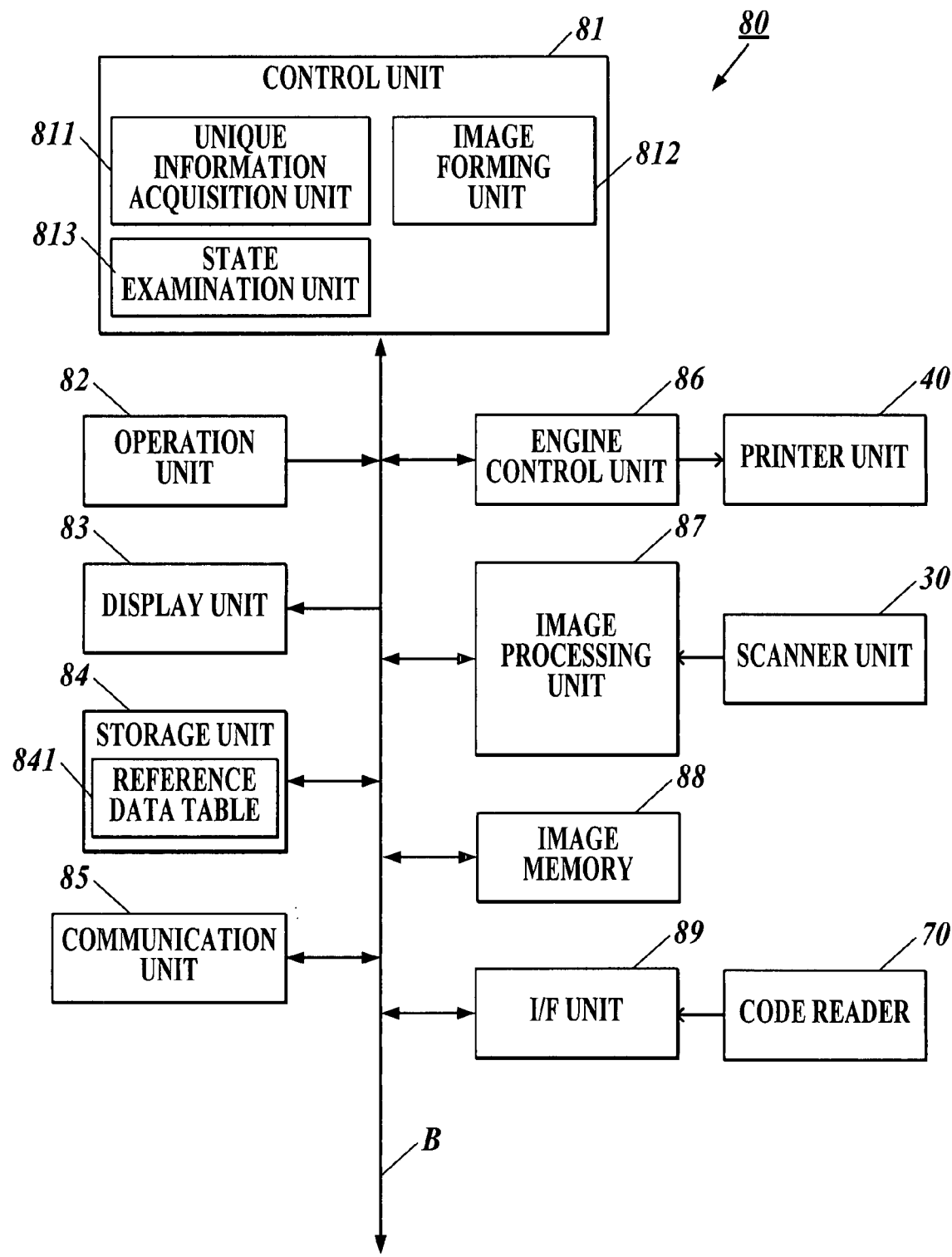
FIG. 3 is a block diagram showing the main control configuration of the image forming apparatus.

The scanner unit 30 reads an image from the document 2 conveyed by the automatic document feed apparatus 20, and generates the document data expressing the image to output the generated document data to a control unit 81 (see FIG. 3). The scanner unit 30 is provided with an exposure scan unit 35 equipped with a light source 33 and a mirror 34, a line image sensor 36 receiving a reflected light from the document 2 to output electric signals according to the intensities of the received light, a collective lens 37 collecting the reflected light from the document 2 to the line image sensor 36, various mirrors 38 forming an optical path for leading the reflected light from the mirror 34 of the exposure scan unit 35 to the line image sensor 36, and a platen sensor (not shown) for detecting the existence of the document 2 on a platen glass 32.

If the document 2 conveyed by the automatic document feed apparatus 20 is read, the exposure scan unit 35 moves to the reading place under the contact glass 31 and stops there, and the image of the document 2 conveyed by the contact roller 23 above the exposure scan unit 35 is read. In the case of one-side reading, the image on the top surface (or the front surface) side of the document 2 placed on the document placing tray 21 is to pass the contact glass 31 and to be read. On the other hand, in the case of both-side reading, after the image on the front surface side of the document 2 placed on the document placing tray 21 has passed the contact glass 31 to be read, the document 2 is inverted. Consequently, the image on the under surface (or the back surface) side is to pass the contact glass 31 to be read.

If the document 2 placed on the platen glass 32 is read, the exposure scan unit 35 moves from the left to the right along the under surface of the platen glass 32 to read the document 2 at rest. That is, the image on the back surface side of the document 2 placed on the platen glass 32 is to be read with the exposure scan unit 35.

In such a way, the scanner unit 30 is configured to be able to read the image of the document 2 on any one side of the front surface and the back surface thereof.

The printer unit 40 forms (or prints) the image expressed by the data to be a print object on a recording medium by an electrophotographic process. The printer unit 40 is provided with a laser unit 41 outputting a laser light turned to be on or off according to the printing image data generated from document data under the control of an engine control unit 86 (see FIG. 3), which will be described later, a photosensitive body 42, on the surface of which an electrostatic latent image is formed, a charging apparatus 43 disposed around the photosensitive body 42, development apparatus 44, a transfer apparatus 45, a separation apparatus 46, and a cleaning apparatus 47.

The photosensitive body 42 is shaped in a cylinder, and is configured to rotate in a fixed direction (or the direction indicated by an arrow A in FIG. 1) by an unshown drive unit. The charging apparatus 43 is an apparatus for uniformly charging the photosensitive body 42 by corona discharge. When the uniformly charged surface of the photosensitive body 42 in such a way is scanned by the laser light output from the laser unit 41, an electrostatic latent image is formed on the surface of the photosensitive body 42.

The development apparatus 44 develops the electrostatic latent image formed on the surface of the photosensitive body 42 as a toner image.

The transfer apparatus 45 electrostatically transfers the toner image on the surface of the photosensitive body 42 to a recording medium by applying an electric field to the photosensitive body 42. The separation apparatus 46 separates the recording medium from the photosensitive body 42 by removing electricity.

The cleaning apparatus 47 removes the toner remaining on the photosensitive body 42 after transfer by scraping the photosensitive body 42 with a blade or the like to collect the removed toner. The collected toner is returned to the development apparatus 44 through an unshown conveyance path. A fixing apparatus 48 pressurizes and heats the toner image on the recording medium to fixate the toner image on the recording medium.

A paper feed unit 50 is provided with a plurality of feed cassettes 51. Record media each having a different size, a different paper type or the like are normally housed in the feed cassettes 51. Second paper feed rollers 52 conveys each of the record media housed in the feed cassettes 51 sheet by sheet from the uppermost part of the record media to a conveyance portion 60.

The conveyance portion 60 is provided with a normal conveyance path 60*a* allowing a recording medium conveyed from the feed cassettes 51 to pass a transfer place between the photosensitive body 42 and the transfer apparatus 45, and to eject the recording medium to the outside of the machine (or to a subsequent image forming and post-processing apparatus (not shown)) further through the downstream fixing apparatus 48, and an inversion conveyance path 60*b* inverting the obverse and the reverse of the recording medium that has passed the fixing apparatus 48 before allowing the recording medium to join to the normal conveyance path 60*a* again on the upstream side of the transfer place.

The conveyance portion 60 is configured to form an image on the front surface of a recording medium when the recording medium first passes through the normal conveyance path 60*a*, and to form an image on the back surface of the recording medium when the recording medium passes the normal conveyance path 60*a* again after having passed the inversion conveyance path 60*b*.

There is disposed a conveyance path switch claw 61 switching the conveyance path of a recording medium at the rear (on the downstream side) of the fixing apparatus 48. When the conveyance path switch claw 61 is switched to a horizontal position shown by a dotted line in FIG. 1, the paper ejection method becomes straight paper ejection, and a recording medium after fixation goes straight on through a conveyance path C to be ejected from a paper ejection portion 64. When the conveyance path switch claw 61 is switched to an inclined position shown by a solid line in FIG. 1, the recording medium is conveyed through a conveyance path D.

The recording medium conveyed through the conveyance path D is conveyed directly to the inversion conveyance path 60*b*, and image formation (or printing) on the back surface thereof is performed after image formation on the front surface thereof in the case of both side printing. When the obverse and the reverse of a recording medium are inverted and the recording medium is ejected after image formation in the case of one-side printing or the like, inversion rollers 62 are reversely driven when the rear end of the recording medium conveyed through the conveyance path D reaches the inversion rollers 62 disposed at a branch point. Herewith, the recording medium is conveyed to the conveyance path C through a conveyance path F, and the recording medium is ejected from the paper ejection portion 64 in the state of the face down, in which the obverse and the reverse of the recording medium are inverted.

A paper ejection sensor 63 is a sensor for detecting the output of a recording medium to the outside of the apparatus. As the paper ejection sensor 63, for example, a photosensor or the like can be applied. The paper ejection sensor 63 detects a recording medium conveyed along the conveyance path C, and outputs the detection signal to the control unit 81 (see FIG. 3), which will be described later.

Moreover, there is provided a code reader 70 capable of reading coded data (hereinafter referred to as "code data") such as a bar code, a two-dimensional code and the like between the paper ejection sensor 63 and the paper ejection portion 64. The code reader 70 reads the code data printed on a recording medium conveyed along the conveyance path C, and outputs decoded code data to the control unit 81, which will be described later. Incidentally, although the present embodiment is designed to adopt a mode in which the code reader 70 performs decoding, the present invention is not limited to the mode, but the mode in which the control unit 81 decodes the code data read by the code reader 70 may be adopted.

FIG. 3 is a block diagram showing the main control configuration 80 of the image forming apparatus 10. As shown in FIG. 3, the image forming apparatus 10 is provided with the control unit 81, an operation unit 82, a display unit 83, a storage unit 84, a communication unit 85, the engine control unit 86, an image processing unit 87, an image memory 88, an I/F unit 89 and the like as the main control configuration 80, and each unit is connected with one another through a bus B.

The control unit 81 is provided with an unshown central processing unit (CPU), a random access memory (RAM) and the like. The CPU executes various kinds of processing using a predetermined area of the RAM as a work area in cooperation with various control programs stored in the storage unit 84 in advance to wholly control the operation of each unit constituting the image forming apparatus 10.

To put it concretely, the control unit 81 realizes the function of the unique information acquisition unit 811 in cooperation with the various control programs stored in the storage unit 84 in advance. The unique information acquisition unit 811 operates a predetermined hash function to each document data included in a print job stored in the storage unit 84 to acquire the hash value unique to each document data as unique information, and allows the storage unit 84 to store the hash value in association with the document data pertaining to the hash value. Hereupon, the hash function is a one-way function such as Message Digest 5 (MD 5), and is the function that easily converts a certain input to output the converted input, but that hardly acquires or cannot acquire the input from the output thereof in the reverse direction. Incidentally, the hash function is operated to the data portion acquired by excluding the header portion from document data, and an acquired hash value is stored in the header portion of the document data corresponding to the hash value.

Furthermore, the unique information acquisition unit 811 sequentially registers the hash values of document data previously acquired into the reference data table of the storage unit 84 as reference unique information. Moreover, when the unique information acquisition unit 811 judges that a specific print condition (for example, "aggregation" or "rotation") is set in print condition information, the unique information acquisition unit 811 acquires a new hash value generated based on the hash value of the document data previously acquired and the print condition information, and sequentially registers the hash values into the reference data table of the storage unit 84 as the reference unique information. Incidentally, when a plurality of pieces of document data are included in a print job, the acquisition order of the hash value pertaining to each document data accords with the order of the print page of each document data that is instructed in the print condition information.

Moreover, the control unit 81 realizes the function as an image forming unit 812 in cooperation with the various control programs stored in the storage unit 84 in advance and the engine control unit 86. The image forming unit 812 controls the operation of the printer unit 40 to allow the printer unit 40 to print an image based on document data in accordance with the print condition information included in a print job on a recording medium.

When the image forming unit 812 judges that a "margin area" is set in print condition information, the image forming unit 812 allows the printer unit 40 to print an image based on the document data included in the print job on a recording medium, and allows the printer unit 40 to print an image based on the hash value stored in the header portion of the document data in the margin area of the same recording medium. Because the image based on a hash value is printed in the margin area of a recording medium in such a way, the image does not hinder the observation of the image based on the document data printed on the same recording medium, and the margin area of the recording medium can be effectively utilized. Incidentally, when the image based on a hash value is printed, the print condition information (for example, "print copies", "number of print pages", "order of print pages", "white paper insertion" and the like) of the document data corresponding to the print pages may be printed in the margin area at the same time.

Moreover, when the image forming unit 812 judges that a specific print condition (for example, "aggregation" or "rotation") is set in print condition information, the image forming unit 812 generates a new hash value based on the hash value stored in the header portion of document data and the print condition information (or the "aggregation" or the "rotation") in place of the hash value stored in the header portion of the document data, and allows the printer unit 40 to print the image based on the new hash value in the margin area of the same recording medium.

Incidentally, the image forming unit 812 has the code data generation function of coding to a bar code, a two-dimensional code and the like, and the image forming unit 812 allows the printer unit 40 to perform the printing of the hash value and the print condition information that are the print objects to be printed in a margin area, on a recording medium in the state of being coded (hereinafter referred to as "code data") by the code data generation function in the present embodiment. Because a hash value is printed on a recording medium in the state of being coded in such a way, the operation of reading the hash value can be made to be more efficient. Moreover, the printing of the hash value and/or the print condition information is not limited to this mode, but a mode performing the printing of the hash value and/or the print condition information in the state as it is without performing any coding (or in a plaintext) can also be adopted.

Moreover, the control unit 81 realizes the function as a state examination unit 813 in cooperation with the various control programs stored in the storage unit 84 in advance. When the state examination unit 813 acquires code data output from the code reader 70 through the I/F unit 89, the state examination unit 813 sequentially reads the hash values registered in the reference data table of the storage unit 84 as reference unique information in a FIFO method, and compares the read hash values with the hash value as unique information to be compared included in the code data to examine the identity of the document data pertaining to printed matter. Here, when the state examination unit 813 judges that the read hash values and the hash value as unique information to be compared do not accord with each other, the state examination unit 813 judges that an abnormality has occurred in the printed state. Then, the state examination unit 813 stops the operation of the printer unit 40, and allows the display unit 83 display to alarm information of alarming the occurrence of the abnormality.

Furthermore, the state examination unit 813 compares the values of the print page counter and the print copy counter of the printed matter with the values of the comparison page counter and the comparison copy counter that are counted at the time of the ejection of the printed matter, respectively, and thereby examines the printed state of the printed matter such as a paging disorder, a missing page and the like. Here, when the state examination unit 813 judges that the values of the print page counter or the print copy counter do not accord with the value of the comparison page counter or the comparison copy counter, the state examination unit 813 judges that an abnormality has occurred in the printed state. Then, the state examination unit 813 stops the operation of the printer unit 40, and allows the display unit 83 to display the alarm information of alarming the occurrence of the abnormality.

Incidentally, although the present embodiment adopts the mode of realizing the unique information acquisition unit 811, the image forming unit 812 and the state examination unit 813 by software processing in cooperation with predetermined programs stored in the storage unit 84 and the control unit 81, it is not limited to this mode, but a mode of realizing the above units by means of dedicated hardware circuits can be adopted.

The operation unit 82 is provided with various input keys and the like, and accepts the information input by a user's operation as an input signal to output the input signal to the control unit 81. The display unit 83 is made of a liquid crystal display (LCD) or the like, and displays various kinds of information based on display signals from the control unit 81. Moreover, the mode in which the display unit 83 constitutes a touch panel together with the operation unit 82 in an integrated fashion may be adopted.

The image forming apparatus 10 is so arranged that a user thereof can instruct various conditions pertaining to the printing of document data through the operation unit 82. The instructed print condition is print condition information, and it is stored in the storage unit 84 as a print job together with the document data. Incidentally, the input instruction of the print conditions may be not only input from the operation unit 82, but also, for example, input from an information processing terminal (not shown) such as the personal computer that is connected to the image forming apparatus 10 through the communication unit 85 or the like.

The storage unit 84 is provided with a nonvolatile storage medium made of a magnetic or an optical recording medium or a semiconductor memory, and stores programs necessary to the operation of the image forming apparatus 10 and the data pertaining to the execution of the programs. Incidentally, the storage medium may be arranged to be detachably mountable on the image forming apparatus 10.

Moreover, the storage unit 84 stores the document data of the document 2 read by the scanner unit 30 or the document data transmitted from the information processing terminal (not shown) connected to the image forming apparatus 10 through the communication unit 85 in the print job unit basis.

Furthermore, the storage unit 84 stores a reference data table 841 for registering hash values as reference unique information. The reference data table 841 is arranged so as to perform the registration/read of data in the FIFO method, and the registration/read of hash values are performed in the order in accordance with the order of print pages of document data under the control of the control unit 81.

The communication unit 85 is a modem, a terminal adapter, a LAN adapter or the like, and performs the communication control of various kinds of information given and received between the image forming apparatus 10 and another information processing terminal connected with a network such as a WAN and a LAN under the control of the control unit 81.

The engine control unit 86 wholly controls the operation of the printer unit 40 under the control of the control unit 81. To put it concretely, the engine control unit 86 outputs the printing image data or the code data that has been read from the image memory 88 to the laser unit 41 at the timing in accordance with the operation of the printer unit 40.

The image processing unit 87 generates printing image data (or bit map data) from the document data included in a print job based on the print condition information of the print job stored in the storage unit 84 under the control of the control unit 81, and allows the image memory 88 to store the generated printing image data.

Moreover, the image processing unit 87 performs predetermined image processing such as tone correction to the document data of the document 2 read by the scanner unit 30, and then the image processing unit 87 stores the processed document data into the storage unit 84.

The image memory 88 is made of a volatile memory such as a synchronous dynamic random access memory (SDRAM), and temporarily stores the printing image data generated by the image processing unit 87 and the code data generated by the control unit 81.

The I/F unit 89 is a communication interface performing data communications with other equipment, and is made of, for example, a universal serial bus (USB), IEEE 1284, IEEE 1394, PCMCIA or the like. Incidentally, the code reader 70 is connected to the I/F unit 89, and that the code data read by being decoded by the code reader 70 is input into the control unit 81 through the I/F unit 89 in the present embodiment.

In the following, the operation of the aforesaid image forming apparatus 10 is described.

First, the procedure of the processing at the time of the input of document data (of a print job) (hereinafter referred to as "document data input processing") through the scanner unit 30 or the communication unit 85 is described with reference to FIG. 4. Incidentally, each processing included in the document data input processing is executed in cooperation with a predetermined program stored in the storage unit 84 under the control of the control unit 81.

First, when the control unit 81 detects the input of the print job (or the document data) through the scanner unit 30 or the communication unit 85 (Step S11; Yes), the control unit 81 sets the value of an document page counter n counting the page number of the document data to one (1) (Step S12).

Next, the control unit 81 refers to the print condition information included in the print job (Step S13) to judge whether a "margin area" is instructed or not (Step S14). Here, when the control unit 81 judges that the "margin area" is not instructed (Step S14; No), the control unit 81 immediately ends the present processing.

On the other hand, when the control unit 81 judges that the "margin area" is instructed at the Step S14 (Step S14; Yes), the control unit 81 executes the hash value acquisition processing at Step S15. In the following, the hash value acquisition processing is described with reference to FIG. 5.

Figure 5:
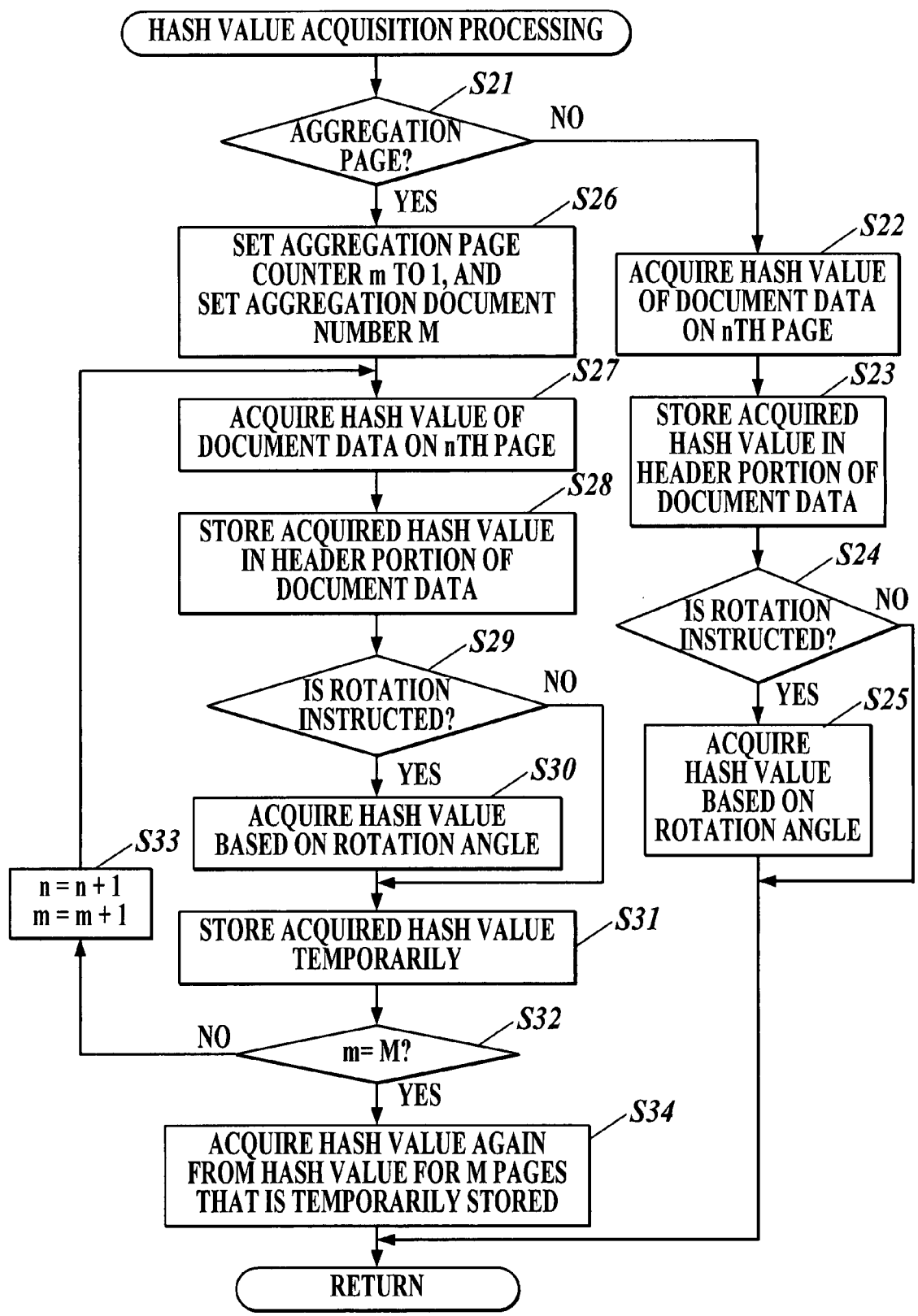
FIG. 5 is a flow chart showing the procedure of hash value acquisition processing.

FIG. 5 is a flow chart showing the procedure of the hash value acquisition processing.

First, the control unit 81 judges whether the "aggregation" of the document data is instructed or not in the print condition information (Step S21). Here, when the control unit 81 judges that the "aggregation" is not instructed (Step S21; No), the control unit 81 operates the predetermined hash function to the document data on an $n^{th}$ page to acquire a hash value (Step S22), and stores the acquired hash value in the header portion of the corresponding document data (Step S23).

Next, the control unit 81 judges whether the "rotation" of the document data is instructed in the print condition information or not (Step S24). Here, when the control unit 81 judges that the "rotation" is instructed (Step S24; Yes), the control unit 81 operates the predetermined hash function to an information group composed of an instructed rotation angle and the previously acquired hash value to acquire a hash value (Step S25), and the control unit 81 shifts the processing to that at Step S16 in FIG. 4.

Moreover, when the control unit 81 judges that the "rotation" of the document data is not instructed in the print condition information at the Step S24 (Step S24; No), the control unit 81 immediately shifts the processing to that at the Step S16 of FIG. 4.

On the other hand, when the control unit 81 judges that the "aggregation" of the document data is instructed in the print condition information at the Step S21 (Step S21; Yes), the control unit 81 sets the value of an aggregation page counter m counting the number of the document data to be an aggregation object to one (1), and sets an aggregation document number M instructed as the number of the document data to be aggregated (Step S26).

Next, the control unit 81 operates the predetermined hash function to the document data on the $n^{th}$ page included in the print job to acquire a hash value (Step S27), and stores the acquired hash value into the header portion of the document data (Step S28).

Next, the control unit 81 judges whether the "rotation" of the document data is instructed in the print condition information or not (Step S29). Here, when the control unit 81 judgers that the "rotation" is instructed (Step S29; Yes), the control unit 81 operates the predetermined hash function to an information group composed of an instructed rotation angle and the previously acquired hash value to acquire a new hash value (Step S30), and shifts the processing to that at Step S31.

Moreover, when the control unit 81 judges that the "rotation" of the document data is not instructed in the print condition information at the Step S29 (Step S29; No), the control unit 81 immediately shifts the processing to that at the Step S31.

At the Step S31, after the control unit 81 allows the storage unit such as the unshown RAM or the like to store temporarily the finally acquired hash value (Step S31), the control unit 81 judges whether the value of the aggregation page counter m accords with the aggregation document number M or not (Step S32). Here, when the control unit 81 judges that the value of the aggregation page counter m does not accord with the aggregation document number M (Step S32; No), the control unit 81 increments the value of the document page counter n by one (1), and increments the value of the aggregation page counter m by one (1) (Step S33). Then, the control unit 81 again returns the processing to that at the Step S27.

Moreover, when the control unit 81 judges that the value of the aggregation page counter m and the aggregation document number M accord with each other at the Step S32 (Step S32; Yes), the control unit 81 operates the predetermined hash function to the information group composed of the hash values of the document data for M (m) pages, which hash values are temporarily stored, to acquire a new hash value (Step S34), and shifts the processing to that at the Step S16 of FIG. 4.

Figure 4:
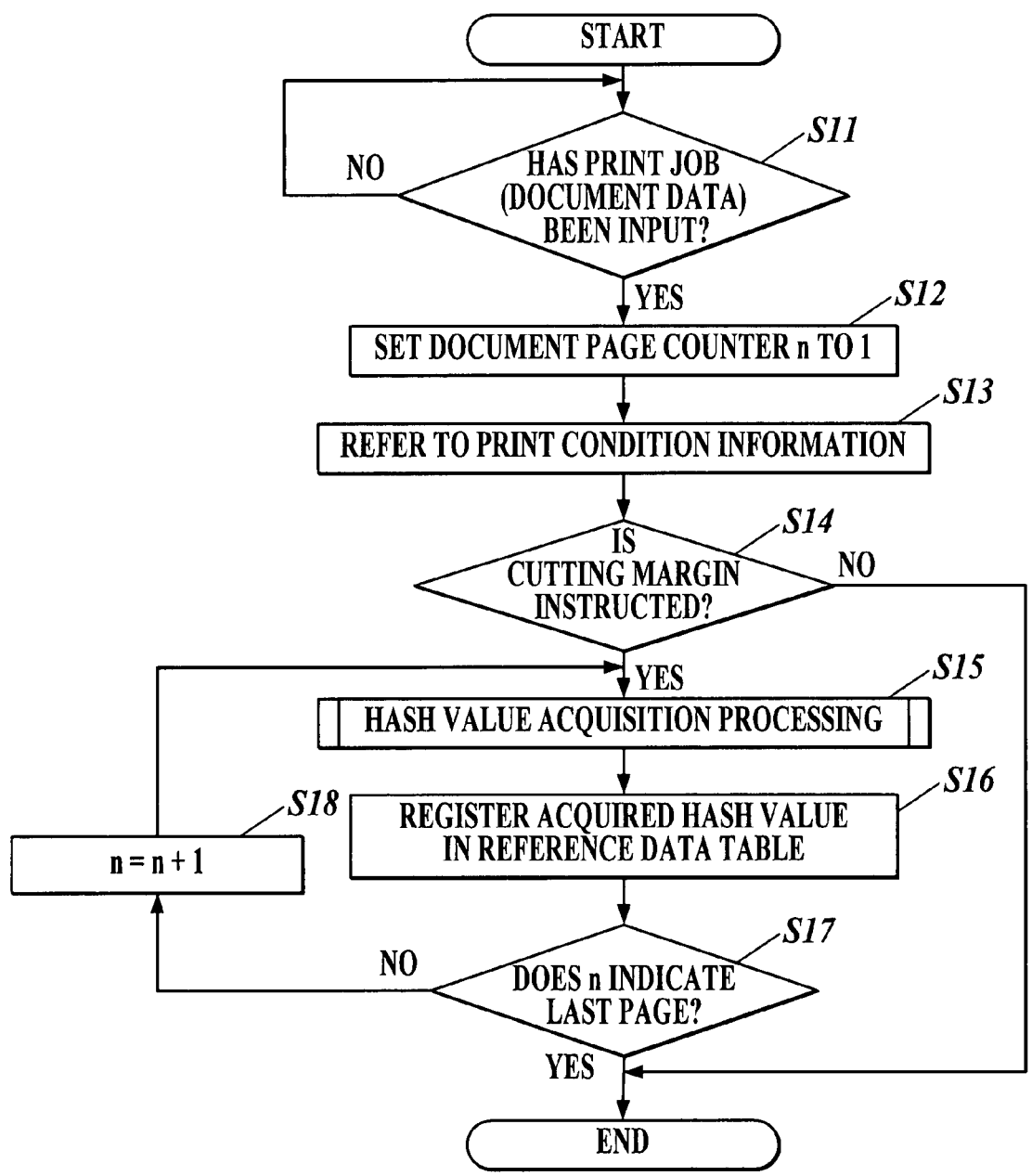
FIG. 4 is a flow chart showing the procedure of document data input processing.

Returning to the processing in FIG. 4, the control unit 81 registers the hash value finally acquired in the hash value acquisition processing (Step S15) into the reference data table 841 of the storage unit 84 as the reference unique information (Step S16).

Next, the control unit 81 judges whether the page of the document data pertaining to the present processing (the document page counter n) is the last page or not, namely judges whether the processing at the Steps S15 and S16 has been performed to all of the document data included in the print job or not (Step S17). Here, when the control unit 81 judges that the processing has not been performed to all of the document data yet (Step S17; No), the control unit 81 increments the value of the document page counter n by one (1) to set the document data on the next page to be an object of the processing (Step S18), and then the control unit 81 returns the processing at that at the Step S15 again.

Moreover, when the control unit 81 judges that the processing at the Steps S15 and S16 has been performed to all of the document data included in the print job at the Step S17 (Step S17; Yes), the control unit 81 ends the present processing.

In such a way, the hash value pertaining to each document data is registered in the reference data table 841 of the storage unit 84 as the reference unique information by the execution of the document data input processing at each input of a print job (or the document data thereof). Incidentally, although the present embodiment adopts the mode of not acquiring the hash value of the document data in the print condition information of which no "margin area" is instructed, it is not limited to this mode, but a mode of acquiring the hash values of all of the document data irrespective of print condition information, or a mode of acquiring a hash value only when other print condition information is instructed can be adopted.

Figure 6:
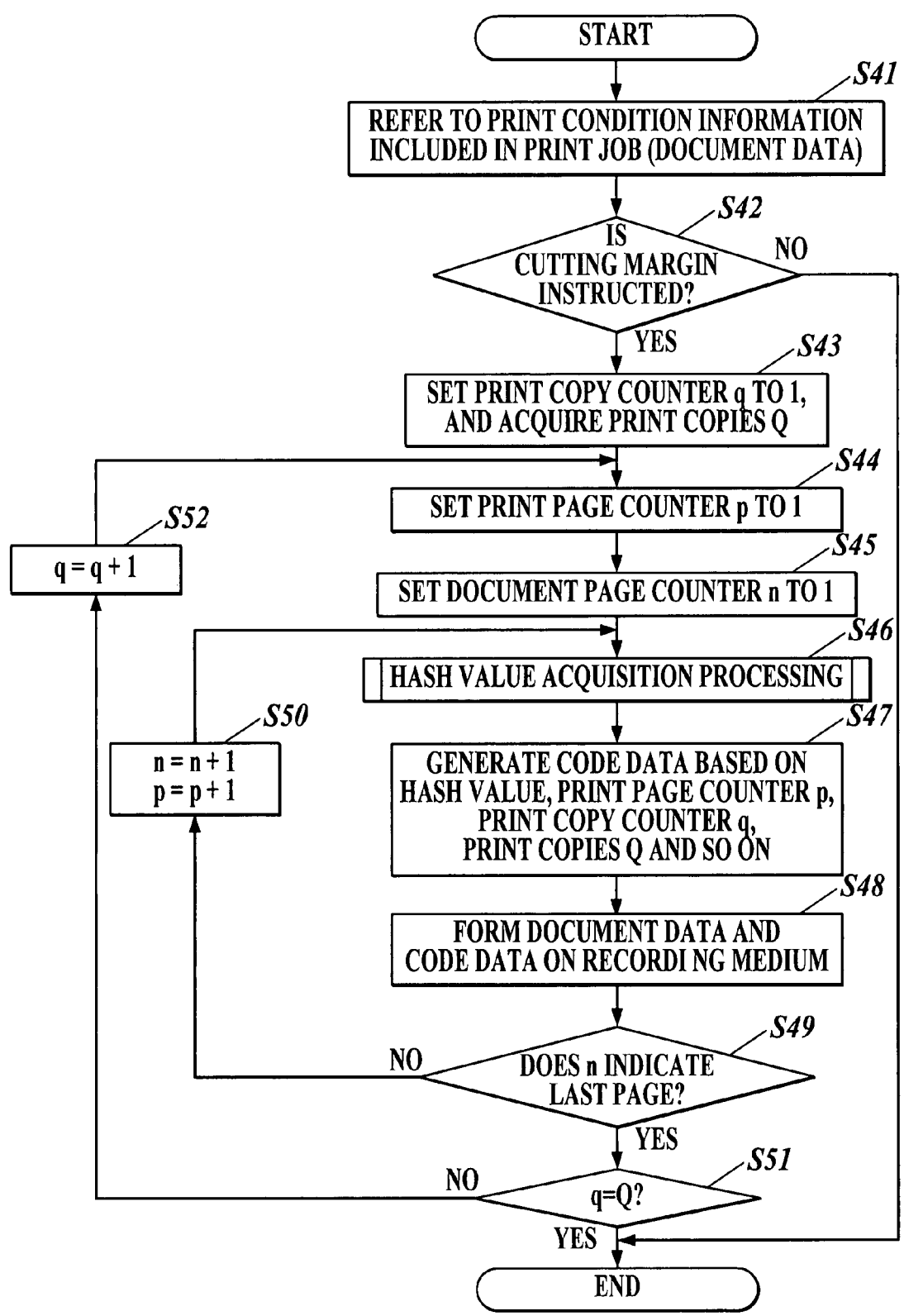
FIG. 6 is a flow chart showing the procedure of document data print processing.

Next, the procedure of the processing at the time of performing the printing of document data (hereinafter referred to as "document data print processing") is described with reference to FIG. 6. Incidentally, each processing included in the document data print processing is executed in cooperation with a predetermined program stored in the storage unit 84 under the control of the control unit 81.

First, the control unit 81 refers to the print condition information included in a print job (Step S41) to judge whether a "margin area" is instructed in the print condition information or not (Step S42). Here, when the control unit 81 judges that the "margin area" is not instructed (Step S42; No), the control unit 81 ends the present processing, and then controls the printer unit 40 to allow the printer unit 40 to print the image based on the document data on a recording medium in accordance with the print condition information.

On the other hand, when the control unit 81 judges that the "margin area" is instructed in the print condition information at the Step S42 (Step S42; Yes), the control unit 81 sets the value of a print copy counter q counting print copies to one (1), and acquires the value of print copies Q instructed in the print condition information (Step S43).

Next, the control unit 81 sets the value of a print page counter p counting the page number of the record media to be printed to one (1) (Step S44). Furthermore, after setting the value of the document page counter n counting the page number of the document data to one (1) (Step S45), the control unit 81 executes the hash value acquisition processing (Step S46). Incidentally, because the hash value acquisition processing at the Step S46 is the same as the contents of the processing illustrated in the FIG. 5, the detailed description thereof is omitted.

At the successive Step S47, the control unit 81 encodes the information group composed of the hash value finally acquired in the hash value acquisition processing at the Step S46, the values of the print page counter p, the print copy counter q and the print copies Q included in the print condition information, and the like to generate the code data (Step S47).

And the control unit 81 controls the printer unit 40 to allow the printer unit 40 to print the image based on the document data according to the print condition information on the recording medium, and to allow the printer unit 40 to print the generated code data in the margin area of the recording medium (Step S48).

Next, the control unit 81 judges whether the page of the document data pertaining to the present processing (of the document page counter n) is the last page or not, namely judges whether the processing at the Steps S46-S48 has been performed to all of the document data included in the print job or not (Step S49). Here, when the control unit 81 judges that the processing at the Steps S46-S48 has not been performed to all of the document data yet (Step S49; No), the control unit 81 increments the value of the document page counter n by one (1), and increments the value of the print page counter p by one (1) (Step S50). Then, after preparing the printing of the next page, the control unit 81 returns the processing to that at the Step S46 again.

On the other hand, when the control unit 81 judges that the processing at the Steps S46-S48 has been performed to all of the document data at the Step S49 (Step S49; Yes), the control unit 81 further judges whether the value of the print copy counter q accords with the print copies Q or not (Step S51). Here, when the control unit 81 judges that the value of the print copy counter q does not accord with the print copies Q (Step S51; No), the control unit 81 increments the value of the print copy counter q by one (1) to prepare the printing of the next set (Step S52), and then returns the processing to that at the Step S44 again. Moreover, when the control unit 81 judges that the value of the print copy counter q accords with the print copies Q at the Step S51 (Step S51; Yes), the control unit 81 ends the present processing.

As described above, as for the print job (the document data) to which the "margin area" is instructed as the print condition information, the document data print processing is executed, and thereby the document data and the code data pertaining to the document data are to be printed on the same recording medium. Then, the printed recording medium (or the printed matter) passes through the conveyance path C to be ejected from the paper ejection portion 64.

Figure 7:
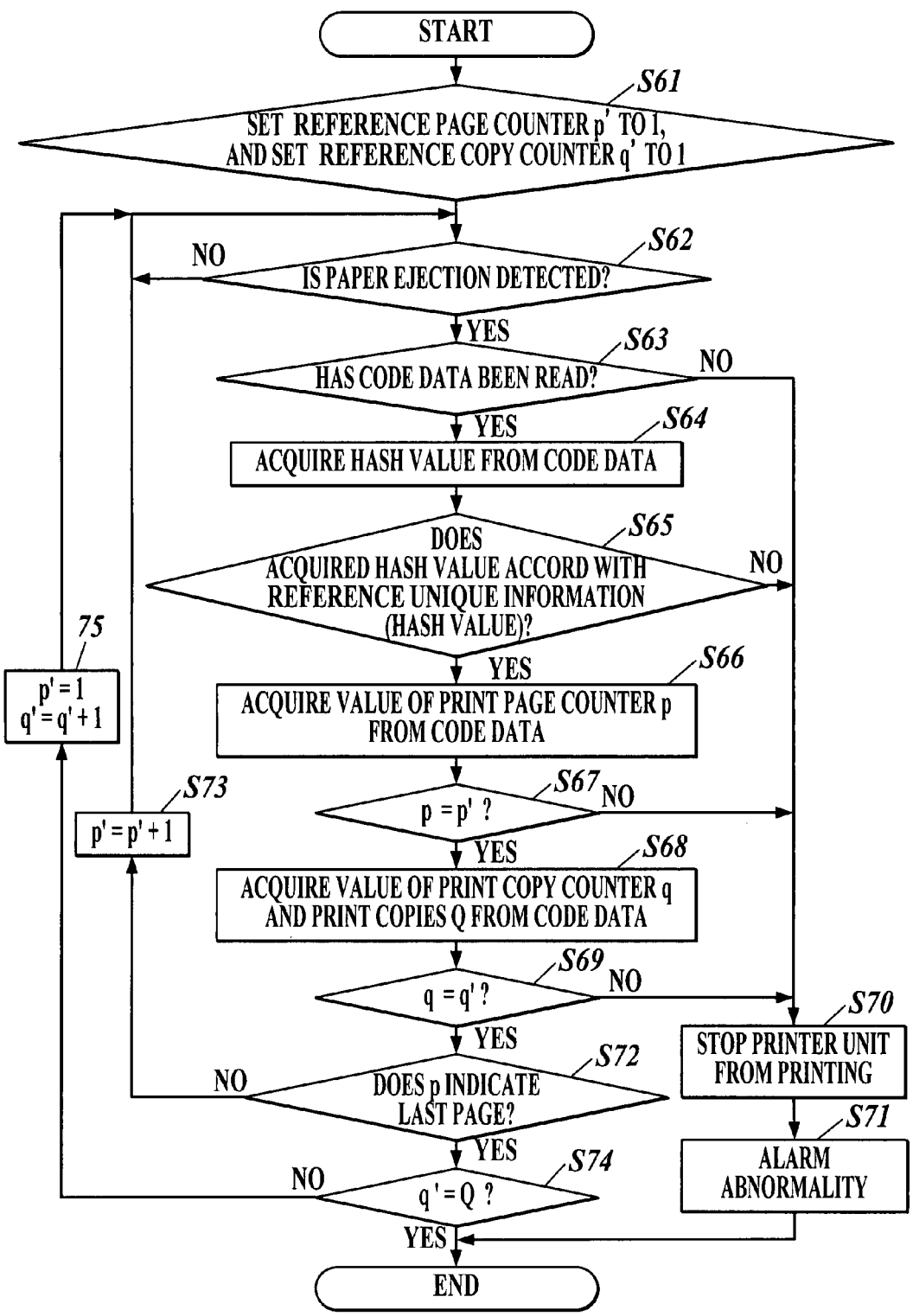
FIG. 7 is a flow chart showing the procedure of printed state examination processing.

Next, the procedure of the processing pertaining to the examination of a printed state (hereinafter referred to as "printed state examination processing") that is performed when printed matter is ejected is described with reference to FIG. 7. Incidentally, the present processing is executed to the printed matter printed by the aforesaid document data print processing, and each processing included in code data read processing is executed in cooperation with a predetermined program stored in the storage unit 84 under the control of the control unit 81.

First, the control unit 81 sets the value of a comparison page counter p' performing the comparison with the page number of the printed matter (the value of the print page counter) to one (1), and sets the value of a comparison copy counter q' performing the comparison with the set number of the printed matter (the value of the print copy counter) to one (1) as the prior processing (or the preparation) of the present processing (Step S61).

Next, the control unit 81 stands by the input of a detection signal from the paper ejection sensor 63 (Step S62; No). When the control unit 81 ascertains the input of the detection signal from the paper ejection sensor 63 (Step S62; Yes), the control unit 81 judges whether code data has been able to be read from the printed matter based on the code data input from the code reader 70 or not (Step S63).

When the code data has not input yet, namely when the control unit 81 judges that the code has not been able to be read from the printed matter at the Step S63 (Step S63; No), the control unit 81 judges that the printed state includes an abnormality, and immediately shifts the processing to that at Step S70, where the function pertaining to printing is stopped.

On the other hand, when the control unit 81 judges that code data has been input, namely judges that the code data has been able to be read from the printed matter at the Step S63 (Step S63; Yes), the control unit 81 acquires the hash value included in the code data (Step S64). Next, the control unit 81 compares the hash value acquired at the Step S64 with the reference unique information (or the hash value) registered in the reference data table of the storage unit 84 to judge whether the values of the acquired hash values and the hash value as unique information to be compared accord with each other or not (Step S65). Here, when the control unit 81 judges that the acquired hash values and the hash value as unique information to be compared do not accord with each other (Step S65; No), the control unit 81 judges that the printed state includes an abnormality, and immediately shifts the processing to that at the Step S70, where the function pertaining to printing is stopped. Moreover, when the control unit 81 judges that the acquired hash values and the hash value as unique information to be compared accord with each other at the Step S65 (Step S65; Yes), the control unit 81 shifts the processing to that at Step S66. At the Step S66, the control unit 81 acquires the value of the print page counter p from the code data input at the Step S63 (Step S66). Then, the control unit 81 compares the value of the acquired print page counter p with the value of the present comparison page counter p' to judge whether the value of the acquired print page counter p and the value of the present comparison page counter p' accord with each other or not (Step S67).

Here, when the control unit 81 judges that the value of the print page counter p and the value of the comparison page counter p' do not accord with each other (Step S67; No), the control unit 81 judges that the printed state includes an abnormality, and immediately shifts the processing to that at the Step S70, where the function pertaining to printing is stopped. Moreover, when the control unit 81 judges that the value of the print page counter p and the value of the comparison page counter p' accord with each other (Step S67; Yes), the control unit 81 shifts the processing to that at Step S68.

At the Step S68, the control unit 81 acquires the value of the print copy counter q and the print copies Q from the code data input at the Step S63 (Step S68). Then, the control unit 81 compares the value of the acquired print copy counter q with the value of the present comparison copy counter q' to judge whether the value of the acquired print copy counter q and the value of the present comparison copy counter q' accord with each other or not (Step S69).

Here, when the control unit 81 judges that the values of the print copy counter q and the comparison copy counter q' are not accord with each other (Step S69; No), the control unit 81 judges that the printed state includes an abnormality, and immediately shifts the processing to that at the Step S70, where the function pertaining to printing is stopped.

At the Step S70, the control unit 81 controls the engine control unit 86 to stop the printing of the document data by the printer unit 40 (Step S70). Then, after the control unit 81 allows the display unit 83 to display the alarm information alarming the occurrence of an abnormality in the printed state of the printed matter (Step S71), the control unit 81 ends the present processing.

On the other hand, when the control unit 81 judges that the value of the print copy counter q and the value of the comparison copy counter q' accord with each other at the Step S69 (Step S69; Yes), the control unit 81 judges whether the page of the printed matter (indicated by the print page counter p) pertaining to the present processing is the last page or not (Step S72). Here, the judgment at the Step S72 may be performed based on the reading of the printing image data of the engine control unit 86. Alternatively, when the number of the total print pages can be previously grasped based on the information included in the print condition information or the like, the judgment at the Step S72 may be performed by comparing the number of the total print pages with the value of the reference page counter p'.

When the control unit 81 judges that the printed matter pertaining to the present processing is not the last page at the Step S72 (Step S72; No), the control unit 81 increments the value of the comparison page counter p' by one (1) (Step S73), and then the control unit 81 returns the processing to that at the Step S62.

Moreover, when the control unit 81 judges that the printed matter pertaining to the present processing is the last page thereof at the Step S72 (Step S72; Yes), the control unit 81 compares the value of the present comparison copy counter q' with the value of the print copies Q acquired at the Step S68 to judge whether the value of the present comparison copy counter q' and the value of the print copies Q accord with each other or not (Step S74).

Here, when the value of the comparison copy counter q' and the value of the print copies Q do not accord with each other (Step S74; No), the control unit 81 sets the value of the comparison page counter p' to one (1), and increments the value of the comparison copy counter q' by one (1) (Step S75). Then, the control unit 81 returns the processing to that at the Step S62 again.

On the other hand, when the control unit 81 judges that the values of the comparison copy counter q' and the print copies Q accord with each other at the Step S75 (Step S75; Yes), the control unit 81 ends the present processing.

As described above, according to the present embodiment, the hash value unique to document data is stored as the reference unique information, and the hash value is printed on the same recording medium as the one on which the document data is printed. Then, the printed code data (or unique information to be compared) is compared with the reference unique information. Herewith, because the ascertainment of the identity of the document data to be the print object and the document data printed on the recording medium becomes possible, the accuracy of the abnormality judgment of the printed matter can be improved. Moreover, because the abnormality judgment of the printed matter is performed based on the unique information unique to the document data, the data quantity pertaining to the abnormality judgment can be suppressed, and the configuration of the apparatus can be made to be more efficient.

Moreover, because the abnormality judgment of printed matter can be performed based on a new hash value generated based on the print conditions of document data, it becomes possible to ascertain the identity of the print conditions of the document data to be the print object and the print conditions of printed document data, and the accuracy of the abnormality judgment of the printed matter can be improved.

Moreover, because a hash value is used as the unique information, the data quantity pertaining to the abnormality judgment of printed matter can be suppressed, and the configuration of the apparatus can be made to be more efficient.

The constructional details and the detailed operation of the image forming apparatus of the aforesaid embodiment can be suitably changed without departing from the scope of the present invention.

For example, although the image based on a hash value is set to be printed in the margin area of a recording medium in the aforesaid embodiment, the printing place is not limited to the margin area, but the mode of printing the image in any other areas may be adopted.

Moreover, although a new hash value (or the reference unique information) is generated based on the hash value of document data and the information directly related to the state of the document data at the time of printing such as the "rotation" and the "aggregation" among a plurality of pieces of set information included in the print condition information in the aforesaid embodiment, the new hash value is not limited to the aforesaid one, but the other instruction information included in the print condition information may be also included.

Moreover, although the aforesaid embodiment adopts the mode of displaying the alarm information alarming an abnormality detected in the printed state of printed matter on the display unit 83 when the abnormality is detected, the alarming is not limited to such mode, but, for example, the mode of providing a sound generation apparatus such as a speaker or a buzzer separately to alarm the abnormality by the sound generation apparatus may be adopted. Alternatively, the mode of transmitting the alarm information alarming an abnormality to an external apparatus connected through the communication unit 85 or the I/F unit 89 may be adopted.

Moreover, although the aforesaid embodiment adopts the mode of printing an image based on the hash value pertaining to the printing of document data on a recording medium, the mode of printing is not limited to such one. For example, if a radio frequency identification (RFID) tag is added to a recording medium, the mode of providing an RFID writer capable of storing information into the RFID tag separately to store the hash value, the print condition information and the like that are related to the printing of the document data into the RFID tag with the RFID writer at the time of the printing of the recording medium may be adopted. Incidentally, in this case, the image forming apparatus 10 is provided with an RFID reader capable of reading information from an RFID tag in place of the code reader 70.

The aforesaid embodiment stores the unique information unique to document data as the reference unique information, and prints the unique information on the same recording medium as the one on which the document data is printed to compare the printed unique information (or the unique information to be compared) with the reference unique information. Herewith, it becomes possible to ascertain the identity of the document data to be a print object and the document data printed on the recording medium. Consequently, the accuracy of the abnormality judgment of the printed matter can be improved. Moreover, because the abnormality judgment of the printed matter is performed based on the unique information unique to document data, the data quantity pertaining to the abnormality judgment can be suppressed, and the configuration of the apparatus can be made to be more efficient.

Moreover, because the abnormality judgment of the printed matter based on new unique information generated based on the print conditions of document data can be, performed in the aforesaid embodiment, it becomes possible to ascertain the identity of the print conditions of the document data to be an print object and the print conditions of the printed document data, and consequently the accuracy of the abnormality judgment of the printed matter can be improved.

Moreover, because a hash value is used as the unique information in the aforesaid embodiment, the data quantity pertaining to the abnormality judgment of printed matter can be suppressed, and it becomes possible to make the configuration of the apparatus more efficient.

Moreover, because the image based on the unique information is printed in the margin area of a recording medium, the image does not hinder the observation of the image based on the document data which image is printed on the same recording medium, and the margin area of the recording medium can be effectively utilized.

Moreover, in the aforesaid embodiment, because the unique information is encoded and the encoded unique information is printed on the recording medium, the operation pertaining to the read of the unique information can be made to be more efficient.

What is claimed is:

1. An image forming apparatus, comprising:
   a unique information acquisition unit which acquires first unique information, unique to document data to be a print object, from the document data;
   a storage unit which stores the acquired first unique information as reference unique information in association with the document data;
   an image forming unit which prints an image based on the document data and an image based on second unique information associated with the document data on a same recording medium, wherein the second unique information is generated during print processing after the first unique information is acquired;
   a reading unit which reads the second unique information of the printed image as unique information to be compared; and
   a control unit which compares the second unique information to be compared, which is read by the reading unit, with the reference unique information, which is stored in the storage unit, to stop printing of the document data when the control unit judges that the second unique information to be compared and the reference unique information do not accord with each other,
   wherein when print condition information instructing a given print condition of the document data is input: (i) the unique information acquisition unit acquires first new unique information which is generated based on the first unique information and the print condition information (ii) the storage unit stores the first new unique information as the reference unique information, and (iii) the image forming unit prints an image based on second new unique information and an image based on the document data on the same recording medium, wherein the second new unique information is generated during the print processing based on the second unique information and the print condition information; and
   wherein the image forming unit prints the image based on the second unique information or the image based on the second new unique information in a margin area of the recording medium.

2. The image forming apparatus of claim 1, wherein each of the first and second unique information and the first and second new unique information is a hash value.

3. The image forming apparatus of claim 1, wherein the image forming unit encodes the second unique information or the second new unique information to print an image based on the coded unique information on the recording medium.

4. The image forming apparatus of claim 1, wherein the print condition includes at least one of a condition regarding aggregation of the document data and a condition regarding rotation of the document data.

* * * * *